United States Patent [19]

Anderson

[11] Patent Number: 5,458,219
[45] Date of Patent: Oct. 17, 1995

[54] PRESSURIZED SHOCK ABSORBER

[76] Inventor: Richard D. Anderson, 1893 Gainsborough Dr., Atlanta, Ga. 30341

[21] Appl. No.: 370,118

[22] Filed: Jan. 9, 1995

Related U.S. Application Data

[63] Continuation of Ser. No. 135,045, Oct. 12, 1993, abandoned, which is a continuation of Ser. No. 986,990, Dec. 8, 1992, abandoned, which is a continuation of Ser. No. 860,050, Mar. 30, 1992, abandoned, which is a continuation of Ser. No. 521,538, May 10, 1990, abandoned, which is a continuation of Ser. No. 858,908, Apr. 30, 1986, abandoned, which is a continuation of Ser. No. 578,097, Feb. 7, 1984, abandoned.

[51] Int. Cl.$^6$ ........................................ F16F 9/43
[52] U.S. Cl. ............... 188/322.21; 188/315; 267/64.28
[58] Field of Search ................ 188/315, 322.21; 267/64.28; 141/319, 348, 386

[56] References Cited

U.S. PATENT DOCUMENTS

| | | | |
|---|---|---|---|
| 2,571,279 | 10/1951 | Myklestad | 188/315 |
| 3,659,684 | 5/1972 | Porter | 188/322.21 |
| 4,335,871 | 6/1982 | Molders | 188/322.21 X |

FOREIGN PATENT DOCUMENTS

| | | | |
|---|---|---|---|
| 519312 | 3/1940 | United Kingdom | 188/322.21 |
| 2099956 | 12/1982 | United Kingdom | 188/322.21 |

OTHER PUBLICATIONS

Brake & Front End, Industry Briefs, pp. 17–18, Jul. 1982.

*Primary Examiner*—Matthew C. Graham
*Assistant Examiner*—Peter M. Poon
*Attorney, Agent, or Firm*—Jones & Askew

[57] ABSTRACT

An improvement is provided in a dual tube hydraulic shock absorber having an annular reservoir with a gas cell therein, which comprises advice for charging and pressurizing the shock absorber with hydraulic fluid while substantially degassing the shock absorber. Preferably, the device comprises an external access port to the reservoir, the port being located toward the uppermost internal surface of the shock absorber relative to its use configuration, and a valve integral to the port. Additionally, an associated method is provided for pressurizing and degassing a dual tube, gas cell hydraulic shock absorber.

10 Claims, 2 Drawing Sheets

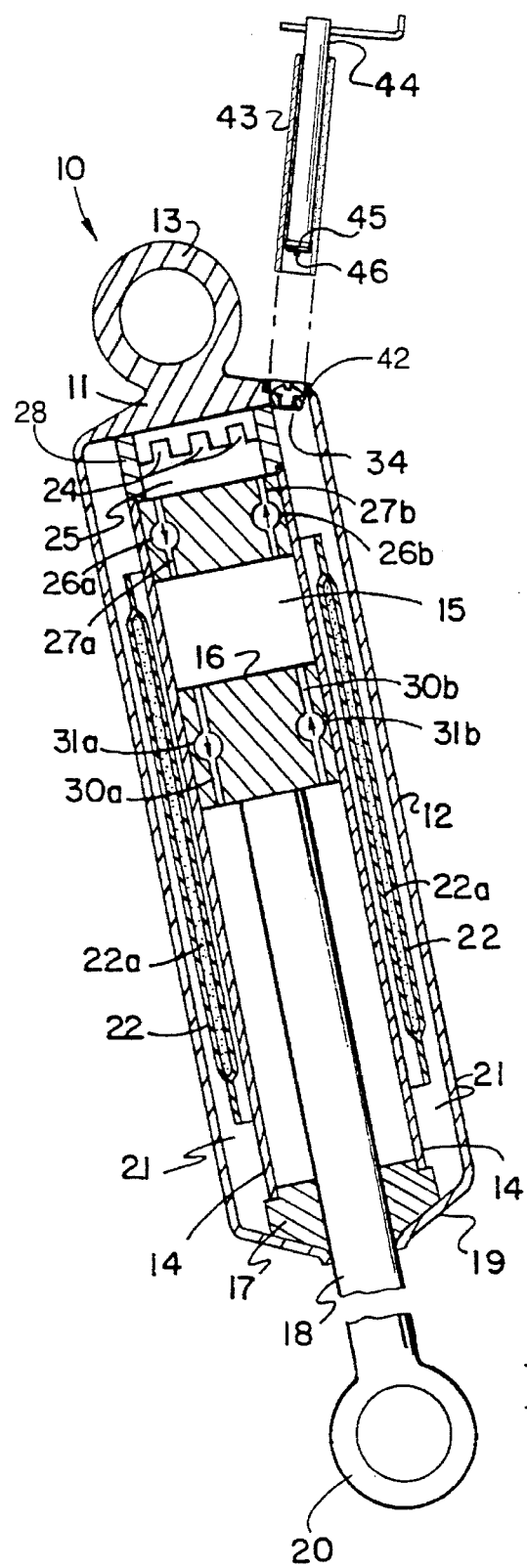
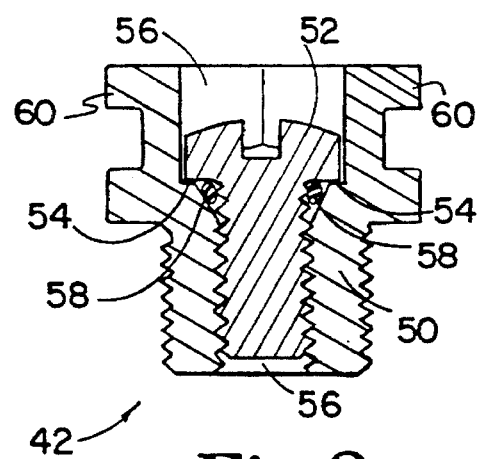
Fig. 1
Fig. 2

PRESSURIZED SHOCK ABSORBER

This is a continuation of application Ser. No. 08/135,045 filed Oct. 12, 1993;now abandoned which in turn is a continuation of application Ser. No. 07/986,900 filed Dec. 8, 1992; now abandoned which in turn is a continuation of application Ser. No. 07/860,050, filed Mar. 30, 1992, now abandoned; which in turn is a continuation of application Ser. No. 07/521,538, filed May 10, 1990, now abandoned; which in turn is a continuation of application Ser. No. 06/858,908, filed Apr. 30, 1986, now abandoned; which in turn is a continuation of application Ser. No. 578,097, filed Feb. 7, 1984, now abandoned.

BACKGROUND OF THE INVENTION

This invention relates generally to a pressurized shock absorber and relates particularly to a pressurized and degassed dual tube hydraulic shock absorber having a gas cell.

In a conventional type of hydraulic shock absorber, a piston is carried on the end of a reciprocating rod that extends from the shock absorber cylinder and is connected to one part of a movable mass, such as the chassis of a motor vehicle being the typical use configuration, or alternatively to the vehicle running gear for inverted mounting of the shock absorber. The piston reciprocates in the cylinder which is in flow communication with a reservoir for hydraulic fluid displaced from the cylinder, the cylinder and reservoir structure usually being connected to another movable mass, such as the running gear of a motor vehicle or alternatively to the vehicle chassis for inverted mounting. In the dual tube type of shock absorber, a cylindrical body tube surrounds the cylinder. The annular space between the body tube and the cylinder forms a reservoir for hydraulic fluid. A volume of fluid equal to the displacement of the rod on which the piston is mounted is displaced from the shock absorber cylinder through suitable resistance valves in the piston and in the base of the cylinder into the reservoir during the compression stroke of the shock absorber. On the rebound stroke, the volume of fluid that was displaced from the shock absorber cylinder during the compression stroke is returned to the shock absorber cylinder from the reservoir through a low resistance valve to refill the cylinder. Examples of dual tube hydraulic shock absorbers are disclosed in U.S. Pat. No. 3,763,970.

To provide compensating space for the pulsing action of the hydraulic fluid between the shock absorber cylinder and the reservoir, a volume of gas is retained in the reservoir. However, this gas volume is preferably isolated from contact with the hydraulic fluid, since pulsing flow of hydraulic fluid between the shock absorber cylinder and the reservoir causes a high degree of turbulance of the fluid in the reservoir with the result that the hydraulic fluid picks up air in the reservoir and becomes aerated to such an extent as to cause a disturbing reduction in shock dampening capacity of the shock absorber.

To avoid this aeration effect in the hydraulic fluid, deformable gas bags or cells are placed within the reservoir to isolate the hydraulic fluid within the shock absorber from gas contact, the shock absorber being completely filled with hydraulic fluid with the exception of the closed gas cell . This cell contains a predetermined volume of a selected gas. The volume of the selected gas in the sealed cell is such that under conditions of full collapse of the shock absorber (full compression stroke) at the highest temperature expected in normal operation, the cell will not be fully collapsed. Thus, there will always be a gas volume in the reservoir chamber to accommodate liquid displaced from the shock absorber cylinder. The gas volume in the cell is also such that when the shock absorber is fully extended at the lowest temperature at which it normally operates, the expansion of the gas in the cell will still sufficiently displace the hydraulic fluid to insure filling of all voids in the shock absorber. Also, the cell tends to compensate for normal expansion and contraction of the hydraulic fluid during operation of the shock absorber in various ambient temperatures.

Thus, with the gas in the reservoir chamber completely isolated from the hydraulic fluid, there will be no absorption of the gas into the hydraulic fluid, and aeration of the hydraulic fluid is eliminated. Representatively, dual tube, gas cell hydraulic shock absorbers are disclosed in U.S. Pat. No. 2,997,291; 3,123,347; and 3,024,875 hereby incorporated by reference.

Notwithstanding the use of gas cells, there remains a problem in removing small amounts of residual air remaining after filling a gas cell shock absorber with hydraulic fluid thereby preventing full benefit of use of the gas cell. As representatively shown in U.S. Pat. No. 3,024,875 cited above, a relatively small amount of free air in the reservoir, e.g. 2 to 4% by volume, has a substantial effect on the response lag of the shock absorber.

Additionally, there is a problem with air ingression during the useful life of the shock absorber as hydraulic fluid gradually leaks in the seal area around the piston rod where the rod enters the shock absorber. Gas cell materials have been used which tend to absorb air dissolved in the hydraulic fluid. However, during relatively short periods of extreme operation, this selective absorption is not effective.

SUMMARY OF THE INVENTION

It is an object of the invention to provide a dual tube, gas cell hydraulic shock absorber having means for simply and effectively degassing residual air from the shock absorber.

It is another object to provide a dual tube, gas cell hydraulic shock absorber having means for degassing residual air from the shock absorber coincidentally with selective pressurization of hydraulic fluid within the shock absorber.

It is another object to provide, in such a shock absorber, for reduced air ingression over its useful life and for selective adjustment of its response characteristics via selective pressurization of the hydraulic fluid within the shock absorber.

Accordingly, there is provided in a dual tube hydraulic shock absorber having an annular reservoir with a gas cell therein, the improvement comprising apparatus for charging and pressurizing the shock absorber with hydraulic fluid while substantially degassing the shock absorber.

Preferably, the apparatus includes an external access port to the reservoir, the port being located toward the uppermost internal surface of the shock absorber relative to its use configuration. Most preferably, the port is located toward the body end of the shock absorber so that the shock absorber is configured for inverted mounting in its use configuration.

Preferably, the port further includes a valve integral to the port. Advantageously, further apparatus is provided for injecting into the port an incremental quantity of hydraulic fluid corresponding to that required to compress a substantially full charge of hydraulic fluid at atmospheric pressure to a selected elevated pressure.

Additionally, there is provided a method for pressurizing and degassing a dual tube hydraulic shock absorber having an annular reservoir with a gas cell therein, including opening an access port to the reservoir; then substantially filling the shock absorber with hydraulic fluid through the port while oriented such that the port is uppermost; then injecting into the port an incremental quantity of hydraulic fluid to compress the hydraulic fluid to an elevated pressure; and then closing the port.

BRIEF DESCRIPTION OF THE DRAWINGS

Further details are given below with reference to the drawings wherein:

FIG. 1 is a schematic longitudinal cross section of a dual tube, gas cell hydraulic shock absorber having a reservoir access port in accordance with a preferred embodiment of the invention;

FIG. 2 shows in longitudinal cross section a screw valve for installation in the access port of the foregoing embodiment;

DESCRIPTION OF THE PREFERRED EMBODIMENTS

Figure 3:
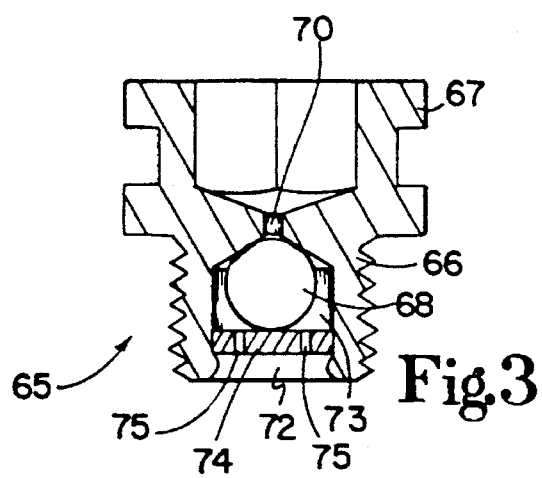
FIG. 3 shows in longitudinal cross section a check valve for installation in the access port of the foregoing embodiment.

In FIG. 1, there is shown in cutaway fashion a dual tube, gas cell hydraulic shock absorber 10 improved in accordance with the invention. The interior structural elements are depicted schematically, which are conventional as representatively shown in the above cited patents. First, the basic functioning of a dual tube, gas cell hydraulic shock absorber is described. Shock absorber 10 has an exterior cylindrical body 12 with interior cylinder 14 in which piston 16 reciprocates. Piston 16 is actuated by piston rod 18 which has fitting 20 for securing the rod to the running gear of a vehicle (not shown). Conventional sea 17 substantially prevents leakage of hydraulic fluid where the piston rod enters the shock absorber. The annular space between the cylinder and the body of the shock absorber is a reservoir 21 containing a conventional gas cell 22. The reservoir 21 and the cylinder volume 15 are in hydraulic communication through ports 24 and valves 26a, 26b which are integral to annular support member 28. The piston 16 has flow conduits 30a, 30b therethrough with flow control valves 31a, 31b, which are check valves configured to separate the action of the valves depending on the direction of movement of piston 16. The entire interior space of the shock absorber is filled with hydraulic fluid. Thus, in operation with the body end 11 affixed to the vehicle chassis utilizing fitting 13, the vehicle running gear in response to road roughness will move the piston upward on its compression stroke. The shock absorber 10 is shown with an orientation corresponding to a preferred inverted mounting configuration, as further discussed below. The shock absorber resists this compression motion to a selected extent by selection of flow resistance through control valve 31a. Further, a compensating volume of hydraulic fluid must be displaced due to the additional volume of the piston rod entering the cylinder on a compression stroke. The compensating flow of hydraulic fluid is discharged from cylinder volume 15 through a discharge valve 26b to plenum 25 and then to the reservoir 21 via ports 24. In response, the gas cell 22 in the reservoir 21 is compressed by this compensating discharge flow. After the vehicle running gear moves over the road roughness that actuated the foregoing compression stroke, the extension stroke begins, as actuated by conventional spring bias on the running gear (not shown). Further, since piston rod volume is being withdrawn from the cylinder volume, a compensating hydraulic fluid flow moves from the reservoir 21 to the cylinder volume 15 via ports 24, plenum 25 and replenishing valve 26a. As the piston returns to its nominal position during the extension stroke, hydraulic fluid flows through conduit 27a according to flow resistance of replenishing valve 26a, which operates as a check valve. Flow resistance of the replenishing valve 26a is preferably minimized. During this replenishing flow, the gas cell 22 expands to a compensating extent, thereby keeping reservoir 21 filled with hydraulic fluid.

The shock absorber 10 is improved in a preferred embodiment of the invention by the addition of an external access port 34 with integral charging valve 42 to the annular reservoir 21, preferably located at about the uppermost internal surface 35 of the shock absorber body relative to its installed use configuration, as shown. Optionally, the charging valve 42 could be affixed external of the access port 34. Further, it is preferred that the installed use configuration be that of inverted mounting as shown, e.g. the body end 11 is affixed to the vehicle chassis and the shaft end 19 is affixed to the vehicle running gear. Generally, the purpose of inverted mounting is to minimize inertial effects in that the movable mass associated with the shaft end of the shock absorber is typically less than the mass associated with the body end of the shock absorber. Optionally, however, the configuration could be reversed such that the access port would be located at the shaft end of the shock absorber and mounting 20 would be installed on the chassis of the vehicle.

The improvement of the invention is readily understood by considering a charging sequence whereby the shock absorber 10 is initially filled with hydraulic fluid. First, the piston rod 18 is moved to its fully extended position, and the charging valve 42 is opened. This reference configuration with the piston rod fully extended corresponds to minimum rod volume or displacement internal to the shock absorber. The shock absorber is oriented such that the opened access port is uppermost relative to the interior volume of the shock absorber (as shown). Then the interior space of the shock absorber is substantially filled with conventional hydraulic fluid, such as petroleum base oil having a viscosity somewhat lighter than SAE #5 oil. Note that filling in this way causes the interior space of the shock absorber to be vented, i.e. air is displaced from within the shock absorber as filling proceeds. Any residual air will then be at the port and is vented by continuing to fill until the access port is filled with hydraulic fluid.

Charging cylinder 43 being of an inside diameter that sealingly fits, preferably with an o-ring seal, over the external protrusion of valve 42. Charging cylinder 42 is thusly fitted and then filled with hydraulic fluid. Plunger 44 is then inserted into charging cylinder 42 and pushed downward through the charging cylinder to inject the incremental amount of hydraulic fluid from cylinder 43 through valve 42 into reservoir 21, thereby to compress the substantially full charge of hydraulic fluid already in the interior space of the shock absorber. Care should be exercised in inserting plunger 44 into charging cylinder 43 so as not to entrap air therein. Plunger 44 is sized to closely fit the inside diameter of charging cylinder 43 and preferably has a rubber o-ring 45 to promote closeness of fit. At the completion of injection, the plunger will be depressed against charging valve 42. The plunger 44 has engaging head 46 for closing the access port valve 42, being a screw valve, so that the plunger 44 may be rotated in the charging cylinder 43 until the engaging head 46 engages the head of the screw valve, and upon further rotation of the plunger in the appropriate direction the access valve is screwed shut.

Therefore, at this point in the charging sequence, the hydraulic fluid within the shock absorber has been compressed to an elevated pressure above atmospheric pressure, and residual air has been removed from the shock absorber. Preferably, the charging cylinder is of a selected capacity such that by filling the cylinder with hydraulic fluid and then injecting that volume into the shock absorber, the hydraulic fluid within the shock absorber will be pressurized to a selected extent. Further, an especially advantageous feature of the invention permits this selective pressurization to be conducted with the shock absorber installed on the vehicle, which is especially important for high-performance racing vehicles subject to extreme conditions of use over relatively short time periods.

The gas cell 22 in the reservoir 21 of the shock absorber 10 is of conventional design, as disclosed in the patents cited above, and preferably is of a material that is permeable to gases that may be evolved from the degradation of the hydraulic fluid under normal extended use. Thus, substantially all of any evolved gases will eventually migrate to the interior 22a of the gas cell 22, thereby maintaining the hydraulic fluid within the shock absorber in a substantially degassed condition. Initial pressurization of the gas cell interior 22a is selected as being commensurate with the desired pressurization of the hydraulic fluid. Generally, as hydraulic fluid pressurization is increased, gas cell internal pressure is correspondingly increased.

Pressurization of the hydraulic fluid has two primary effects. First, hydraulic fluid pressurization, as conducted in accordance with the invention, substantially degasses the shock absorber which has the effect of enhancing the response characteristics of the shock absorber, i.e. response lag is diminished. Further, when the shock absorber is in a condition near its fully extended configuration, pressurization suppresses any dissolved gases from coming out of solution. Additionally, pressurization serves as a barrier against air ingression. The extent of pressurization of the hydraulic fluid has an upper limit so as not to jeopardize integrity of seal 17.

Second, by virtue of the pressurization of the hydraulic fluid, pressurization of the gas cell may be commensurately increased thereby enhancing the response characteristics on the extension stroke of the shock absorber in that replenishing flow will be accelerated by the relatively accelerated expansion of the gas cell. This effect is especially pronounced when the shock absorber is in a condition near its fully extended position.

Another substantial advantage arises from pressurization of the hydraulic fluid in that the sealing ability of rod seal 17 (shown generally) is improved. As a general rule, conventional seals are typically energized by differential pressure such that pressure of the contained fluid urges the seal into closer fit with the seal seat.

Thus, the shock absorber is seen to be pressurized without the use of a pressurizing overgas which would adversely aerate the hydraulic fluid as discussed above. For example, an additional 10 cc of hydraulic fluid added to the conventionally sized automobile shock absorber increases the fluid pressure to about 3 psig. This relatively small increase causes only a small outward pressure on the piston rod of roughly 0.6 pounds, yet provides that the shock absorber will function normally until it leaks more than 10 cc of fluid (a relatively large amount of leakage). Thus, air ingression is substantially eliminated. Further, the fluid is maintained under positive pressure at low temperature extremes.

Generally, increased high pressure in the cell 22 produces an increased resistance to compression during movement of the piston 16 on a compression stroke, analogous to increased stiffness of a spring. On the other hand, increased pressure in the cell promotes replenishing flow from reservoir 21 to cylinder space 15 on an extension stroke. Thus, by selecting internal pressurization of the gas cell 22 relative to the desired pressurization of the hydraulic fluid, the response lag of the shock absorber is minimized due to enhanced replenishing flow. Also, the volume of gas charged into the cell is sufficient to prevent complete collapse of the gas cell when the shock absorber is fully compressed under the lowest operating temperature range at which the shock absorber is expected to perform satisfactorily.

Preferably, the gas cell is constructed in conventional fashion of a nylon sheet film representatively having a thickness of about two to four mils. The cell is conventionally formed by placing two substantially rectangular nylon sheets face to face and edge sealing the configuration, thereby forming a gas chamber. A suitable gas, such as Freon 13, to which the nylon film is impermeable is charged into the gas cell.

In FIG. 2, there is shown in detail a cross section of access valve 42 for the access port 34. Access valve 42, being a screw valve, has a threaded housing 50 configured to be received in the access port 34 having corresponding threading. Inside the housing 50 is a screw 52 which as shown normally is seated against annular seat 54 within the flow conduit 56 through the valve housing 50. Operation of the valve using charging cylinder 43 and plunger 44 is as discussed above.

In FIG. 3, there is shown in cross section another preferred access valve for the access port 34. Alternative access valve 65, being a check valve rather than a screw valve, has a threaded housing 66 configured to be received in the access port 34 having corresponding threading. Inside the housing 66 is a check valve which as shown is a precision elastic ball 68, constructed of rubber or the like, that normally is sealingly compressed against opening 70 of the flow conduit 72 through the valve 65. The ball 68 is retained in a plenum area 73 of the flow conduit 72 by a diffuser plate 74 having a plurality of flow holes 75 (shown generally). Thus, upon the charging cylinder 43 being fitted over the head 67 of the valve housing and upon depression of the charging plunger 44 an injection of hydraulic fluid enters opening 70 of the valve 65 and slightly deforms ball 68 to permit flow therearound. At the conclusion of injection, the ball 68 elastically returns to its nominal sealing position against the periphery of opening 70 of the valve. Prior to injection, residual air is displaced from the shock absorber by depressing ball 68 with an instrument pushed through conduit 70 while filling the valve with hydraulic fluid.

Figure 4:
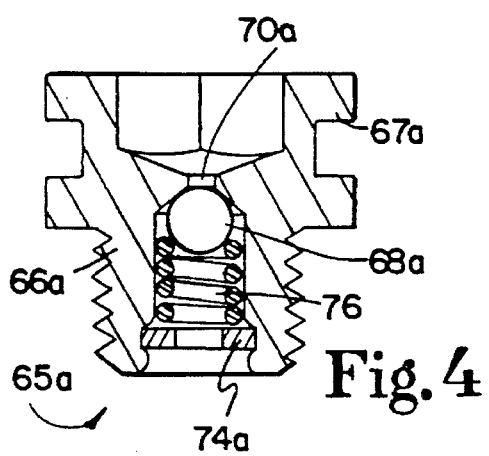
FIG. 4 shows in cross section another check valve.

In FIG. 4, there is an alternative access valve 65a being generally similar to the foregoing check valve arrangement. Ball 68a is urged against flow opening 70a by spring 76 which is supported by diffuser plate 74a. The valve opens by compression of spring 76, rather than by deformation of ball 68a. Otherwise operation of access valve 65a is substantially similar to that of access valve 65. Optionally, the access valve may be welded into the access port or may be integrally formed with the body of the shock absorber.

Figure 5:
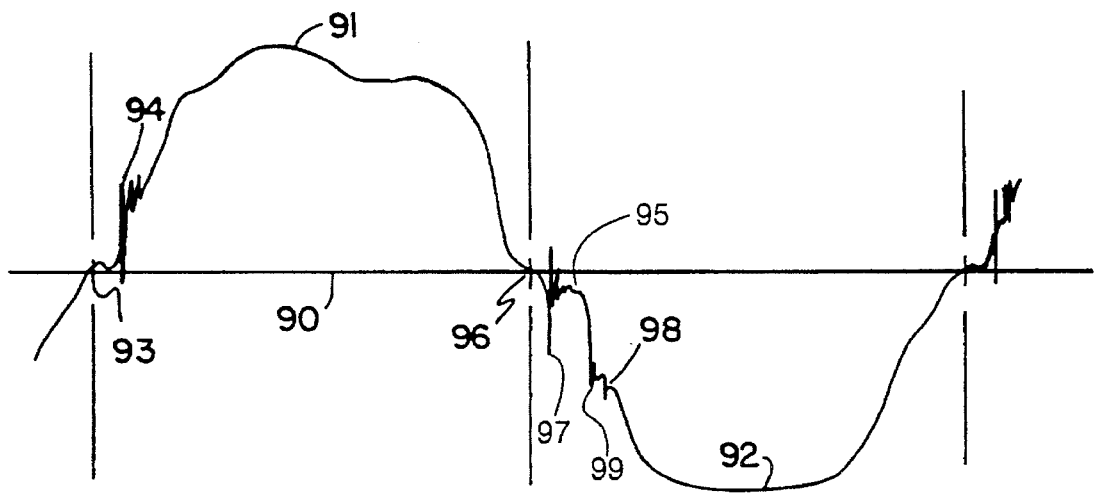
FIG. 5 shows a force-time chart of an operational cycle of a conventional dual tube, gas cell shock absorber.

In FIG. 5, there is shown a force-time curve for an operating cycle of a conventional dual tube, gas cell shock absorber, which does not have benefit of the improvement of the present invention. The conventional shock absorber is further characterized as having a 1⅜ inch bore, a 7 inch stroke, and a gas cell volume of 68 cc. The line 90 represents zero pressure value expressed in pounds applied to a pressure transducer by the fixed end of the shock absorber, the opposite end of the shock absorber being attached to a stroke producing machine effecting a 5 inch stroke of the shock absorber piston at about 220 cycle per minute (one cycle equals one compression and one extension stroke).

Starting at location 93, the portion of the curve above the time line 90 represents the extension stroke of the shock absorber, that is movement of the piston 16 away from the valve 26, while the portion of the curve shown below the time line 90 represents the compression stroke, that is movement of the piston 16 toward the valve 26. As will be seen from the curve, starting at location 93, the pressure builds up in the shock absorber gradually to a maximum value in the vicinity of location 91 and then falls off to zero at location 96, on the time line, which is the point of reversal of the shock absorber from extension stroke to compression stroke. The time element represented by the distance between points 96 and 97 on the curve equals the delay or lag in the shock absorber at the initiation of the compression stroke, probably associated with the first valving set (see valve 31a in FIG. 1), during which control pressure is not developed in the shock absorber as caused by the presence of air in the oil, the piston being required to compress the air in the oil before hydraulic pressure can be developed in the cylinder. A secondary lag is the time element between 95 and 99 and is probably attributable to the second valving set (see valve 26b). Thus, the conventional shock absorber is seen to have lag 94 at the initiation of its extension stroke and lags 97 and 99 at the initiation of its compression stroke. Further as indicated at points 94, 95 and 98, erratic pressure fluctuations are present which are believed to be associated with valve flutter in connection with the respective valves.

Figure 6:
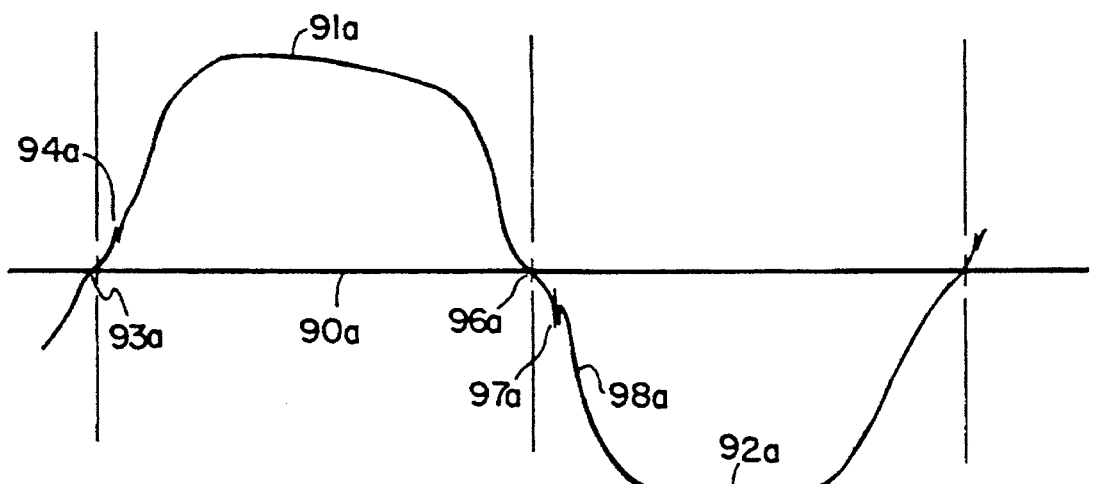
FIG. 6 shows a force-time cycle for a shock absorber according to the invention.

In FIG. 6, a comparative cycle is shown for the shock absorber improved in accordance with the invention, substantially as discussed above in connection with FIG. 1. The improved shock absorber is characterized by an increment injection of about 12.5 cc of hydraulic fluid. In comparing FIGS. 5 and 6, it is seen that secondary lag on the compression stroke at point 98a is substantially eliminated and valve flutter is considerably suppressed. At the beginning of the compression stroke at point 97a it is seen that lag is substantially reduced and valve flutter is substantially suppressed. Likewise at the beginning of the extension stroke at 94a, it is seen that lag and valve flutter are substantially eliminated.

Although the present invention has been described in conjunction with preferred embodiments, it is to be understood that modifications and variations may be utilized without departing from the principles and scope of the invention as defined by the following claims.

I claim:

1. A method for removing substantially all of the residual air from a dual tube shock absorber having an annular reservoir with a gas cell therein and then pressurizing the shock absorber, wherein the annular reservoir has an external access port oriented uppermost with respect to the internal volume of the shock absorber and wherein the external access port is configured for removing residual air from the shock absorber and for substantially filling the shock absorber with hydraulic fluid, wherein the method comprises (a) substantially filling the shock absorber with hydraulic fluid through the external access port, whereby substantially all of the residual air is removed from the shock absorber and (b) injecting an incremental quantity of hydraulic fluid through the port and into the shock absorber to compress the gas within the gas cell and thereby elevate the pressure of the gas and the pressure of the hydraulic fluid within the shock absorber.

2. A method as defined by claim 1 wherein the port is located toward an end of the shock absorber.

3. A method as defined by claim 1 wherein the port is located toward the body end of the shock absorber and wherein the shock absorber is adapted for inverted mounting.

4. A method as defined by claim 1 wherein a valve is contained within the external access port.

5. A method as defined by claim 4 wherein the valve is a check valve.

6. A method for removing substantially all of the residual air from a dual tube hydraulic shock absorber having an annular reservoir with a gas cell therein and then pressurizing the shock absorber, wherein the method comprises:

opening an external access port and substantially filling the shock absorber with hydraulic fluid through the external access port to the annular reservoir, wherein the port is oriented uppermost with respect to the internal volume of the shock absorber to remove substantially all of the residual air from the shock absorber during said filling;

injecting an incremental quantity of hydraulic fluid through the port and into the shock absorber to compress the gas within the gas cell and thereby elevate the pressure of the gas and the pressure of the hydraulic fluid within the shock absorber, while maintaining the orientation; and closing the port while maintaining the elevated pressure.

7. A method as defined by claim 6 wherein the port is located toward an end of the shock absorber.

8. A method as defined by claim 6 wherein the port is located toward the body end of the shock absorber and wherein the shock absorber is adapted for inverted mounting.

9. A method as defined by claim 6 wherein a valve is contained within the external access port.

10. A method as defined by claim 9 wherein the valve is a check valve.

* * * * *